(12) United States Patent
Komanduri et al.

(10) Patent No.: US 10,330,970 B2
(45) Date of Patent: Jun. 25, 2019

(54) VARIABLE LIGHT SHAPING OPTIC USING LIQUID CRYSTALS AND SURFACE RELIEF MICRO-STRUCTURE DIFFUSER

(71) Applicant: ABL IP HOLDING LLC, Conyers, GA (US)

(72) Inventors: Ravi Kumar Komanduri, Brambleton, VA (US); An Mao, Jersey City, NJ (US); Alexander Jacob Schultz, Sterling, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/643,904

(22) Filed: Jul. 7, 2017

(65) Prior Publication Data

US 2019/0011801 A1 Jan. 10, 2019

(51) Int. Cl.
*G02F 1/29* (2006.01)
*G02F 1/1335* (2006.01)
*G02F 1/1343* (2006.01)

(52) U.S. Cl.
CPC .. *G02F 1/133504* (2013.01); *G02F 1/134309* (2013.01); *G02F 1/29* (2013.01); *G02F 2201/12* (2013.01); *G02F 2201/34* (2013.01)

(58) Field of Classification Search
CPC .... G02F 1/29; G02F 2201/12; G02F 2201/34; G02F 1/133504; G02F 1/133553; G02F 1/13363; G02F 1/133606; G02F 1/133526; G02F 2001/294; G02B 5/0278; G02B 27/2214; G02B 27/26; G02B 3/0031; G02B 3/0056; G02B 3/005; G02B 3/0068;
(Continued)

(56) References Cited

U.S. PATENT DOCUMENTS 5,451,766 A * 9/1995 Van Berkel ............ H01L 27/12
250/208.1
5,648,859 A 7/1997 Hirabayashi et al.
7,023,600 B2 4/2006 Mallya et al.
(Continued)

OTHER PUBLICATIONS

Hung-Chun Lin, et al., "A Review of Electrically Tunable Focusing Liquid Crystal Lenses," Transactions on Electrical and Electronic Materials, vol. 12, No. 6, pp. 234-240, Dec. 25, 2011.
(Continued)

*Primary Examiner* — Shan Liu
(74) *Attorney, Agent, or Firm* — RatnerPrestia

(57) ABSTRACT

In a liquid crystal type variable beam shaping optic, a part of a structure that forms a gap for the liquid crystals includes a surface relief micro-structure diffuser. Due to the micro-features of the diffuser, the gap is non-uniform. A voltage applied to an electrode associated with the diffuser and an electrode associated with an opposing substrate controls the orientation of uniaxial nematic liquid crystals in a material filling the non-uniform gap. For example, the index of refraction of the material may vary relative to an index of refraction of the diffuser, based on variations of the crystal orientation caused by variation of the applied voltage. The change in relative indices of refraction, in the examples, changes a focal length of the variable optic and thus the shape of a light beam optically processed through the liquid crystal optic.

7 Claims, 6 Drawing Sheets

(58) Field of Classification Search
CPC ............... G02B 1/041; H04N 13/0404; H04N 13/0454; H04N 13/0456; H04N 13/0406
USPC .................. 349/112, 64, 15, 57, 95, 200
See application file for complete search history.

(56) References Cited

U.S. PATENT DOCUMENTS

| | | | | |
|---|---|---|---|---|
| 2004/0021929 A1* | 2/2004 | Nishioka | ................ | G02C 7/083 359/319 |
| 2004/0164927 A1* | 8/2004 | Suyama | ............ | G02B 27/2271 345/32 |
| 2005/0083564 A1* | 4/2005 | Mallya | ................. | G02F 1/1334 359/238 |
| 2007/0109489 A1* | 5/2007 | Nomura | ............ | G02F 1/133526 349/200 |
| 2008/0284715 A1* | 11/2008 | Kawata | ................ | G02F 1/1323 345/102 |
| 2009/0002612 A1* | 1/2009 | Tamaki | ............ | G02F 1/133753 349/117 |
| 2009/0219478 A1* | 9/2009 | Park | ................... | G02F 1/13731 349/155 |
| 2011/0043717 A1* | 2/2011 | Valyukh | ................... | G02F 1/29 349/33 |
| 2011/0075074 A1* | 3/2011 | Gauza | ............... | C09K 19/0275 349/96 |
| 2013/0076798 A1* | 3/2013 | Wang | .................... | G02F 1/1323 345/690 |
| 2013/0335649 A1* | 12/2013 | Mather | ................. | G02F 1/1323 349/15 |
| 2014/0043572 A1* | 2/2014 | Tang | ................... | G02F 1/13378 349/123 |
| 2016/0026061 A1* | 1/2016 | O'Keeffe | ............... | G02F 1/167 359/296 |
| 2017/0153503 A1* | 6/2017 | Tang | ..................... | G02F 1/137 |

OTHER PUBLICATIONS

Su Xu, et al., "Fast-Response Liquid Crystal Microlens," Micromachines 5, pp. 300-324, Jun. 3, 2014.

J. F. Algorri, et al., "Modal Liquid Crystal Array of Optical Elements," Optics Express, vol. 21, No. 21, pp. 24809-24818, Oct. 9, 2013.

* cited by examiner

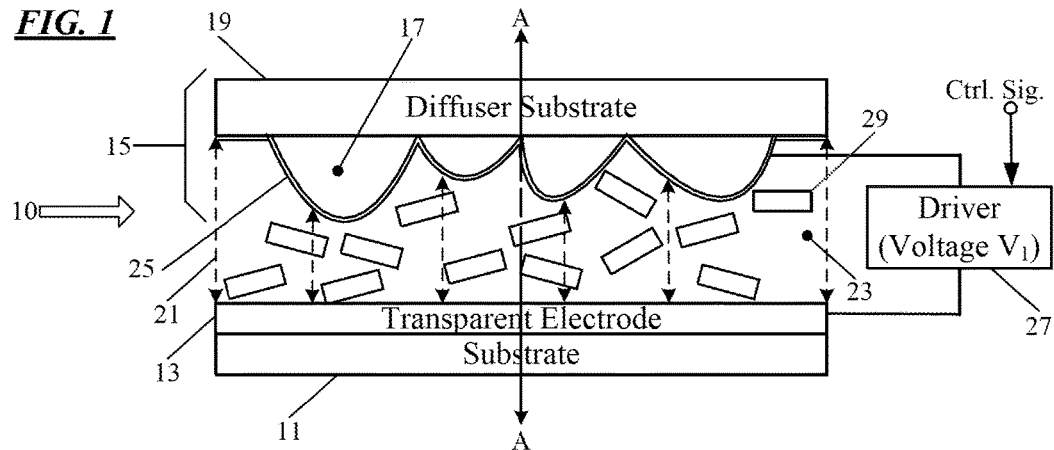
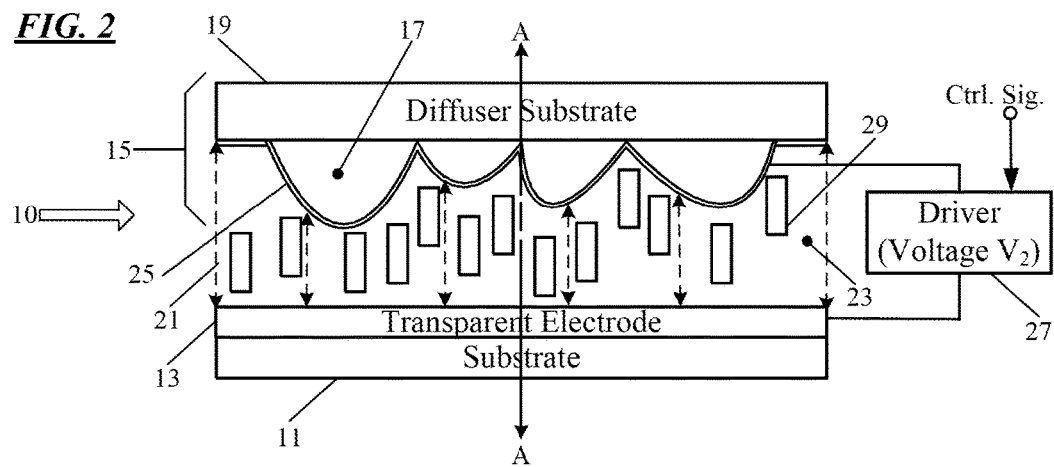
FIG. 3
| | $n_{SUB}$ |
|---|---|
| POLYCARBONATE REFRACTIVE INDEX @ 589 nm (PC) | 1.58 |
| PMMA REFRACTIVE INDEX @ 589 nm (PMMA) | 1.49 |
| POLYETHYLENE REFRACTIVE INDEX @ 589 nm (PE) | 1.51 |

*FIG. 4*

| LIQUID CRYSTAL MATERIAL | OTHER NAMES | CAS # | ORDINARY INDEX (no) | EXTRAORDINARY INDEX (ne) | BIREFRINGENCE ($\Delta n$ = ne-no) | AVERAGE INDEX (navg) | $\Delta\varepsilon$ SIGN | nPC-no | nPC-navg | nPMMA-no | nPMMA-navg | nPE-no | nPE-navg | CN TEMP (°C) |
|---|---|---|---|---|---|---|---|---|---|---|---|---|---|---|
| 4-(trans-4-Pentylcyclohexyl)benzonitrile | 5PCH | 61204-01-1 | 1.49 | 1.61 | 0.12 | 1.53 | + | 0.09 | 0.05 | 0.00 | -0.04 | 0.02 | -0.02 | |
| 4'-Pentyl-4-biphenylcarbonitrile | 5CB | 40817-08-1 | 1.54 | 1.72 | 0.18 | 1.60 | + | 0.04 | -0.02 | -0.05 | -0.11 | -0.03 | -0.09 | 24.00 |
| N-(4-Methoxybenzylidene)-4-butylaniline | MBBA | 26227-73-6 | 1.55 | 1.76 | 0.21 | 1.62 | - | 0.03 | -0.04 | -0.06 | -0.13 | -0.04 | -0.11 | |
| 4-cyano-4'-n-heptyl-biphenyl | 7CB | 41122-71-8 | 1.52 | 1.71 | 0.19 | 1.59 | + | 0.06 | -0.01 | -0.03 | -0.10 | -0.01 | -0.08 | 30.00 |
| 4-cyano-4'-n-oxyoctyl-biphenyl | 8OCB | 52364-73-5 | 1.50 | 1.70 | 0.20 | 1.57 | + | 0.08 | 0.01 | -0.01 | -0.08 | 0.01 | -0.06 | 54.50 |

VARIABLE LIGHT SHAPING OPTIC USING LIQUID CRYSTALS AND SURFACE RELIEF MICRO-STRUCTURE DIFFUSER

TECHNICAL FIELD

The present subject matter relates to variable light shaping optics using liquid crystal materials and surface relief micro-structure diffusers.

BACKGROUND

In recent years, a variety of technologies have been developed for electronically controllable beam shaping, for a variety of applications, such as electrically tunable lenses for camera or flash applications. Other configurations of beam shaping devices have been proposed for lighting applications, such as general illumination and vehicle lamps. Several of these technologies for controllable beam shaping have used liquid crystals.

A first approach uses a non-uniform cell gap for the liquid crystals. Such a device may include a polarizer and flat substrate with a transparent electrode layer on the flat substrate. The switchable liquid crystals are in a gap between the flat electrode of the first substrate and an electrode layer on a second substrate. In a liquid crystal cell with a non-uniform gap, the second electrode and substrate are contoured to provide the non-uniform gap between the electrodes for the liquid crystals. The gap between the electrodes essentially has the shape of a lens, and the gap contains the liquid crystals. Voltages applied to the electrodes align the liquid crystals differently relative to the contoured surface, thereby changing index of refraction of the liquid crystal layer relative to the index of refraction of the curved substrate. The change in the refraction of the liquid crystal layer relative to that of the substrate changes the focal length of the optic and thus the shape of a beam passing through the liquid crystal optic. If one maximum or minimum voltage state places the liquid crystals in an orientation so that the index of refraction of the liquid crystal layer is approximately the same as the index of refraction of the substrate having the curved surface, the cell is substantially transparent (little or no focusing or dispersion of light passing through the lens, e.g. the focal length of the cell approaches infinity). However, as difference between the index of refraction of the liquid crystal layer and the index of refraction of the substrate having the curved surface increases, the focal length of the lens formed by the liquid crystal cell decreases. The non-uniform cell gap approach, however, has some limitations, such as small radius of curvature of the cell gap and the liquid crystal birefringence, which lead to a small tunable range of beam shaping capability. An increase in the size/curvature of the cell gap, for a larger aperture lens, requires an increase in the voltage level applied to change the state of the liquid crystals in the larger gap.

A more common alternate approach utilizes a uniform cell gap for the liquid crystals in combination with patterned electrodes that produce a non-uniform electric field on the liquid crystals to control alignment. Both transparent substrates are flat. In a typical example, the electrode layer on one substrate includes elongated electrodes crossing the cell in a first direction (e.g. like spaced apart rows), and the electrode layer on the other substrate includes elongated electrodes crossing the cell in a second direction orthogonal to the first direction (e.g. like spaced apart columns). This type of cell, typical of modal liquid crystal lens arrays, may be constructed with or without resistive layers. Control of the voltages applied to the electrodes produces a controllable non-uniform electric field in the liquid crystal layer. The non-uniform field produces variations of index of refraction of liquid crystals at different regions or locations distributed across the liquid crystal layer of the cell. Differences in index or refraction of the liquid crystals, relative to the index of refraction of the substrate, provide different amounts of light refraction at the different regions or locations across the cell aperture. Generally, if the electric field profile (for a given set of applied voltages) follows a desired lens profile, then the cell will approximate a lens shaped like the desired lens profile. The limitations of the non-uniform field approach include the need for the fabrication and need for consistent, precise alignment of the patterned electrodes in order to obtain the desired performance. Complex fabrication and alignment requirements which increase manufacturing costs and may reduce product yield. Also, the driver for such a device is more complicated than that for a non-uniform gap type of optic.

SUMMARY

There is room for further improvement in variable optic cell structures that utilize liquid crystals and in/or apparatuses and systems that incorporate variable optic cells that utilize liquid crystals.

By way of a first example, a variable light shaping optic includes a transparent substrate, a first transparent electrode on the transparent substrate and a surface relief micro-structure diffuser. The diffuser is located at a distance from the first transparent substrate to form a non-uniform gap. A uniaxial nematic liquid crystal material fills the non-uniform gap. The optic also includes a second transparent electrode associated with the surface relief micro-structure diffuser. The first and second transparent electrodes are configured to generate an electric field in the liquid crystal material in response to a control voltage applied across the first and second transparent electrodes. The field sets orientation of uniaxial nematic liquid crystals in the material and thus the index of refraction of the uniaxial nematic liquid crystal material filling the non-uniform gap. This index of refraction setting in turn sets a focal length of the variable light shaping optic.

In another example, a variable light shaping optic includes a first transparent substrate and a first transparent electrode on the first transparent substrate. Convex micro-structure features of a surface relief micro-structure diffuser extend outward from a second transparent substrate, toward the first transparent electrode. A second transparent electrode is formed on surfaces of the convex micro-structure features of the diffuser. The first and second transparent substrates are located relative to each other so as to form a non-uniform gap between the first and second transparent electrodes. A uniaxial nematic liquid crystal material fills the non-uniform gap.

In a further example, a variable light shaping optic, has two electrodes with a first of the electrodes formed on a substrate. This optic includes a surface relief micro-structure diffuser located at a distance from the substrate to form a non-uniform gap and a second electrode associated with the surface relief micro-structure diffuser. At least one of the first and second electrodes is transparent. A uniaxial nematic liquid crystal material fills the non-uniform gap.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 1 is a cross-sectional view of a simplified stack for a variable liquid crystal optic using a surface relief micro-structure diffuser, with the liquid crystals in the non-uniform gap in a first orientation state.

FIG. 2 is another cross-sectional view of the variable liquid crystal optic, but with the liquid crystals in the non-uniform gap in a different second orientation state.

FIG. 3 is a table listing different indices of refraction of substrates of several available film type surface relief micro-structure diffusers that may be used in the example of a variable optic shown in FIGS. 1 and 2.

FIG. 4 is a table of data about a number of readily available liquid crystal materials in comparison to data for the film type surface relief micro-structure diffusers listed in table 3.

DETAILED DESCRIPTION

Figure 5:
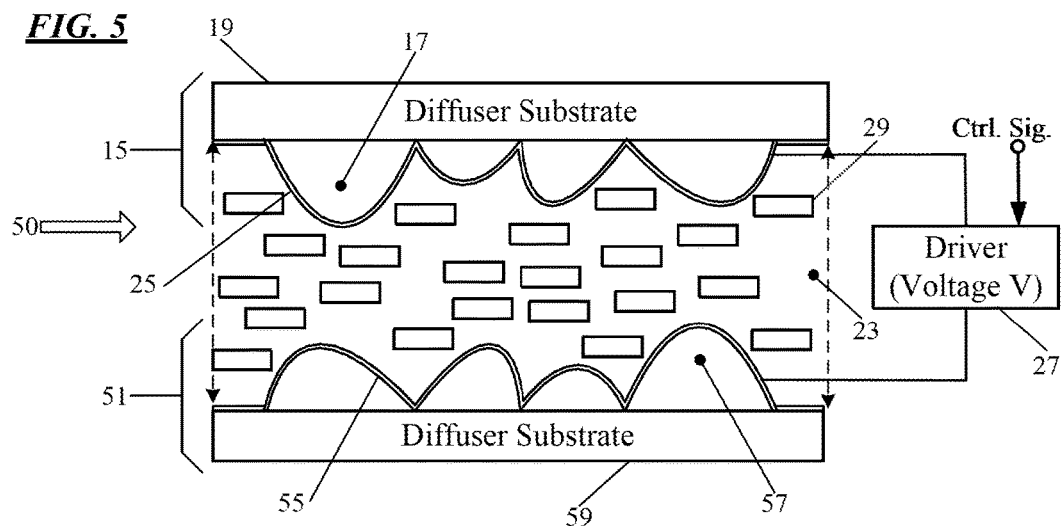
FIG. 5 is a cross-sectional view of a simplified stack for a variable liquid crystal optic using two surface relief micro-structure diffusers.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to beam shaping optics and devices or systems incorporating one or more such optics, where an electrically controllable beam shaping optic uses liquid crystal materials and one or more surface relief micro-structure type light shaping diffusers. The examples discussed below and shown in the drawings use a non-uniform gap type approach, however, the non-uniformity of the gap is a result of inclusion of the patterned surface relief micro-structure type diffuser surface.

A variable liquid crystal optic with the surface relief micro-structure type light shaping diffuser may provide a large numerical aperture lens structure with a small feature size, without the need for a large liquid crystal gap or a large curvature on either side of the optic. Also, the optic with a surface relief micro-structure type light shaping diffuser may operate at lower control voltages than prior non-uniform gap designs, due to its small feature size compared to the typical non-uniform gap design. Compared to the non-uniform field approach, the optic with a surface relief micro-structure type light shaping diffuser does not require complex patterns of electrodes or the more complex drive circuit need to drive the electrode grid to generate the non-uniform electric field. The ability to use simpler electrode configurations simplifies manufacture and component alignment, which should reduce costs.

Reference now is made in detail to the examples illustrated in the accompanying drawings and discussed below. At a high level, a variable light shaping optic includes a transparent substrate, a first transparent electrode on the transparent substrate and a surface relief micro-structure diffuser. The inclusions of the surface relief micro-structure diffuser, for example, creates a non-uniform gap which is fill a suitable liquid crystal material. FIGS. 1 and 2 illustrate a first example of such a liquid crystal variable light shaping optic 10, in two different states.

The first example optic 10 includes the transparent substrate 11 and a first transparent electrode 13 formed on the transparent substrate 11. Although it may have other shapes for some application, in the example, the transparent substrate 11 takes the form of a flat plate. The transparent substrate 11 may be a glass, an acrylic, a plastic, etc. that is sufficiently transparent at least with respect to the wavelength range of light expected to pass through the optic 10. For discussion purposes, we will generally discuss glass as the example material of the substrate 11, although other materials such as the noted examples may be used.

The first example optic 10 also includes a surface relief micro-structure diffuser 15. Some of the examples of surface relief micro-structure diffusers have convex features, whereas other examples of surface relief micro-structure diffusers have concave features. As used here, a "concave" feature is a curved feature that generally curves or extends inward, whereas a convex feature is a curved feature that curves or extends outward.

A variety of diffuser structures may be used. The example optic 10 utilizes a micro-structure film for the diffuser 15, where the film includes convex micro-features 17 formed on a substrate 19 of the diffuser 15. The micro-features 17 are convex in that they extend out from the substrate 19. Diffuser films of the type illustrated in FIGS. 1 and 2 are available, for example, from Luminit, LLC. Using available diffuser films, the micro-structure size of the surface features of the diffuser may be around 5 μm to 20 μm (compared, for example, to the microlens aperture for typical prior non-uniform gap design that is around hundreds of micron and the correspondingly large curvature needed across such an aperture).

The convex micro-features 17 are similar to micro-lenses in an array or the like, except that the features 17 are not as uniform in size or curvature as lenslets of a micro-lens array. The features 17, however, have curved shapes similar to lenses. Hence, the convex micro-features 17 are lens-like but not perfect lenses. In the aggregate, the convex micro-features 17 exhibit an average effective diffusion angle, corresponding to an average radius of curvature.

The material of the features 17 of the surface relief micro-structure diffuser 15 may be the same as or different from the material of the associated substrate 19. Also, if the substrate 19 of the surface relief micro-structure diffuser 15 is sufficiently strong and rigid for the intended application of the optic 10, the substrate 19 may be the only substrate needed to support the diffuser and an associated transparent electrode (discussed in more detailed below). If additional strength or rigidity are desirable for a particular application, the film type diffuser 15 may be applied to an additional transparent substrate (not shown), such as a glass plate or the like similar to the substrate 11.

The diffuser 15 is located at a distance from the first transparent substrate 11 to form a non-uniform gap 21 (as indicated by the several dotted line double arrows). In this first example, the gap 21 is located between first transparent electrode 13 formed on the transparent substrate 11 and the convex micro-features 17 formed on a substrate 19 of the diffuser 15. A uniaxial nematic liquid crystal material 23 fills the non-uniform gap 21.

The first example variable optic 10 also includes a second transparent electrode associated with the surface relief micro-structure diffuser 15. Although other placements/configurations of the second transparent electrode may be used (and examples are discussed relative to later drawings), in this first example, the second transparent electrode 25 is formed on surfaces of micro-structure features 17 of the film type diffuser 15 facing the gap 21. A transparent electrode could be deposited on the planar surface of the diffuser substrate 19 opposite the micro-structure features 17. A reflective electrode at that location may be deposited with metal. In a transmissive optic like that shown in FIGS. 1 and 2, the electrode at that location would be transparent like the electrode 25. Such placement of the electrode may involve use of a thinner diffuser. For example, the current thickness of the diffuser is about 100 μm; however, if the planar, smooth surface is used for the electrode, the voltage to operate the optic 10 would be rather high because of the large thickness of the diffuser substrate 19. However, utilizing a much thinner diffuser film, for example, with a total thickness to the diffuser around 10 or 20 μm, it may be feasible to deposit the electrode onto the planar, smooth surface instead of the surface with the micro-structures.

Returning to the illustrated example, the transparent electrodes 13 and 25 may be formed of any suitable conductor that may be configured to provide sufficient transparency with respect transparent at least with respect to the wavelength range of light expected to pass through the optic 10. The same materials may be used for both of the electrodes 13 and 25, or the transparent electrodes 13 and 25 may be formed of different materials. Examples of suitable transparent conductor materials for the electrodes 13 and 25 include but are not limited to nanowire mesh, Indium Tin Oxide (ITO), Aluminum-doped Zinc Oxide (AZO) or other transparent conductive oxide (TCO), etc. If either of the electrodes 13 and 25 is formed of a conductor that may be susceptible to damage due to exposure to or contact with a particular type of liquid crystal material 23, the surface of the electrode 13 or 25 facing the material 23 in the gap 21 may be coated with a transparent dielectric layer, such as Parylene C, although other non-conductive transparent protective materials may be used.

The transparent electrode 13 is uniformly formed on the first substrate 11; and the other transparent electrode 25 is uniformly formed on surfaces of the features 17 of the surface relief micro-structure diffuser 15. Various techniques may be used to form the electrodes 13, 25 on the respective surfaces; selection of which, for example, may depend on the particular conductor used to implement each electrode. The transparent electrode 25 is relatively thin compared to other elements of the optic 10 through which light will pass. If sufficiently thin, the transparent electrode 25 has minimal impact on refraction of light passing through the liquid crystal material 23 and the surface relief micro-structure diffuser 15. If covered by a protective dielectric coating, such as Parylene C, that coating also is sufficiently thin as to have little or no impact on refraction of light passing through the liquid crystal material 23 and the surface relief micro-structure diffuser 15. Later discussion of optical properties of the system, such as various refraction index differences for different orientation states of the liquid crystals, therefore will mainly consider the properties of the surface relief micro-structure diffuser 15 and the liquid crystal material 23.

The first and second transparent electrodes 13 and 25 are configured to generate an electric field in the liquid crystal material 23 in the non-uniform gap 21, in response to a control voltage V applied across the first and second transparent electrodes, for example, by a suitable driver circuit 27. The field sets orientation of uniaxial nematic liquid crystals 29 in the material 23 and thus the index of refraction of the uniaxial nematic liquid crystal material 23 filling the non-uniform gap 21. This index of refraction setting in turn sets a focal length of the variable light shaping optic 10.

With a configuration like that shown, light passes through the liquid crystal variable optic 10 around the optical axis represented by the line A-A in FIGS. 1 and 2. The optic 10 is capable of variably processing light passing through the 10 in either direction. Light entering from one side of the optic about and generally parallel to the axis (e.g. directed up or down toward the optic) is processed for selective focusing (e.g. selected focused output directed down or up from the optic). Of course, light processing works in both directions, therefore light entering from a focal point (e.g. a point light source) at angles relative to the axis may be controllably output with a focal length or even parallel to the axis, according to the variable voltage setting.

The orientation of the variable liquid crystal optic 10 depicted in FIGS. 1 and 2, with the optical axis vertical, as well as orientations of other variable liquid crystal optics in later drawing figures, are given by way of example only, for illustration and discussion purposes. In operation for a particular variable optical processing application, a variable liquid crystal optic may be oriented in any other direction suitable to the particular application of the optic. Also, to the extent used herein, any directional term, such as lateral, longitudinal, up, down, top, bottom and side, are used by way of example only, and are not limiting as to direction or orientation of any optic or component of an optic constructed as otherwise described herein.

FIG. 1 shows a state of the optic 10 in which the driver 27 applies a first voltage of value $V_1$ across the transparent electrodes 13 and 25. The resulting electric field orients the liquid crystals 29 in the uniaxial nematic liquid crystal material 23 at various random angles relative to the axis A-A of light passing through the variable optic 10 (and relative to the substrate(s) in the example). FIG. 2 shows a state of the optic 10 in which the driver 27 applies a second voltage of value $V_2$ across the transparent electrodes 13 and 25. The resulting electric field orients the liquid crystals 29 in the uniaxial nematic liquid crystal material 23 more generally parallel to the axis A-A of light passing through the variable optic 10. One of the voltages $V_1$ and $V_2$ may be 0V; and the other one of the voltages $V_1$ and $V_2$ will have a maximum amplitude value. Such an optic 10, for example, may be driven with an alternating current (AC) squarewave, however, direct current (DC) and other waveforms can be used. The amplitudes can be as high as 200V, and as low as 10V. The voltage amplitudes used are primarily dependent on the fabrication of the liquid crystal variable light shaping optic 10. In regards to the states when the amplitude is high, versus low, this is dependent on desired ordinary operating condition (alignment state) and which liquid crystals are chosen. In our case, we assume that the liquid crystals are aligned parallel to the axis A-A as in FIG. 2 (perpendicular to the substrate(s)) at high voltage $V_2$, and randomly oriented as in FIG. 1 at low voltage $V_1$.

These two example states illustrated in FIGS. 1 and 2 represent the approximate limits of the range of focal length adjustments, and various intermediate states may be achieved by applying values of voltage V between $V_1$ and $V_2$. Depending on various materials for the components such as the liquid crystal material 23, the electrode 25 and/or the diffuser 15, one illustrated liquid crystal orientation state or the other represents the minimum focal length state of the optic 10 whereas the opposite illustrated liquid crystal orientation state represents the maximum focal length state of the optic 10. In some examples, the maximum focal length state may approach an infinite focal length, e.g. analogous to a transparent flat plate or the like (non-focus/no lens effect).

The driver circuit 27 in the example of FIGS. 1 and 2 applies different values of the voltage V based on a control signal (Ctrl. Sig.) input to the driver circuit 27. The voltage V, for example, may be a direct current (DC) voltage. The driver circuit 27 responds to different data values or levels of the control signal to apply different values of the voltage V to the transparent electrodes 13 and 25. The range of voltages $V_1$ to $V_2$ used to operate the optic 10 of a particular configuration depends on the desired focal length range and/or on aspects of the particular configuration of the optic 10 (e.g. various materials used for the substrates, the electrodes and the diffuser; the size of the liquid crystal gap; and the type of liquid crystal material).

The driver circuit 27 may be a digital to analog controller, a suitable variable voltage generator, or the like. The driver circuit 27 receives the control signal from a higher level control element, examples of which are discussed in more detail later with regard to FIG. 10.

Hence, in this first example, a liquid crystal cell of a variable beam shaping optic 10 includes a transparent substrate 19 on which the features 17 of the beam shaping diffuser film 15 are coated or otherwise formed. A transparent electrode 25, for example formed of ITO, is coated on the features of the diffuser film 15, in the example, on the feature surfaces opposite the substrate 19. In the example of FIGS. 1 and 2, the opposite part of the cell of the optic 10 includes another substrate 11, such as a rigid flat rigid transparent member, for example a glass plate. The other transparent electrode 13, for example formed of ITO, is coated on the surface facing the interior of the cell (toward the electrode layer 25 of the optic).

In an example shown later, an alternate cell structure may include an additional holographic diffuser film. In that alternate example, another diffuser film includes features on a surface of a transparent substrate, with those features facing the interior of the optic. A transparent electrode, for example formed of ITO, is coated on the features of the second holographic diffuser film (surfaces of the features opposite the substrate facing toward the other electrode), instead of on the flat plate.

In either case, the substrates, film(s) and electrodes so formed are assembled into the stack of an optic for containing the liquid crystals. The liquid crystal material 23 is instilled into the interior of the optic between the two electrodes, for example, by capillary action. The electrodes and liquid crystal material form a capacitive system in which a voltage across the electrodes generates charge on the electrodes, creating and electric field in the liquid crystal material (and any other dielectric materials) between the electrodes. The crystals in the liquid crystal material change orientation in response to changes in the electric field.

Suitable examples of the surface relief micro-structure diffuser films available from Luminit, LLC, are designed for lighting applications and may have relatively large radii of curvature producing corresponding relatively large-radii curvatures of the adjacent regions of the non-uniform cell gap.

Depositing ITO or the like on such films and creating a liquid crystal sandwich with the films or other surface relief micro-structure diffusers simplifies the fabrication process, potentially providing a simple, electronically controllable beam shaping solution. Also, the optic could include a liquid crystal alignment layer, however, such a layer is omitted in the examples to simplify the optic structure. For at least some applications, it is believed that the simple structure is sufficient, and a liquid crystal alignment layer is unnecessary.

As shown by the discussion of the first example of the variable liquid crystal optic 10, voltage applied across the electrodes of the optic controls alignment of the liquid crystals within the optic. Different voltages produce different crystal alignments, which cause refractive index differences between the surface features of the patterned surface relief micro-structure diffuser 15 and the surrounding liquid crystal medium 23. The resulting optic may be thought of as an electrically controllable holographic diffuser.

The type of surface relief micro-structure diffuser discussed here differ from a conventional diffuser for lighting applications that is designed to scatter light in all directions. Instead, the surface relief micro-structure diffuser is more like a pattern or array of micro lenses, albeit where the lenses or not all of the same size and shape.

Overall, size and/or shape of the lens-like features 17 of the surface relief micro-structure diffuser are controlled during the film manufacturing process. Control during the manufacturing process enables the manufacturer to create films to different specifications for different diffusion applications. In this way, a manufacturer may offer different grades or types of diffuser film products having different arrangements on the substrate, different lens shapes and/or different average lens sizes. For lighting applications, for example, the different film products exhibit different beam angles of light diffusions; and film type diffusers also are available that exhibit different directional properties (e.g. due to different feature widths in one lateral dimension compared to feature widths in the other lateral dimension). For a specified diffusion angle, the properties of the features vary within certain ranges, and the average of the features provide the specified diffusion angle.

The principles of operation of the diffuser films may be attributed to probably two theories, geometric optics and diffraction optics. From the perspective of geometric optics, diffuser films configured for wider angles of diffusion provide a broader range of focal length settings when used in liquid crystal variable optics, such as the optic 10 shown by way of example in FIGS. 1 and 2. The micro-structure size of the surface features may be in the tens of microns. As mentioned earlier, the micro-structure size of the surface features of available film type diffusers is in the range of around 5 μm to 20 μm. For purposes of the liquid crystal optic, under consideration here, the different lens-like properties of features of different film products give a large effective curvature (corresponding to large diffusion angle in the product specifications for lighting applications). Although micro-scale, the average lens performance of the micro-structure is fairly similar to a single large aperture lens with a large radius curvature, when combined with the liquid crystal material.

Let's explain the operation of the optic 10 in the aspect of geometric optics in somewhat more detail. This approach involves light refraction. Refraction bends light as the light passes from one material to another, where the two materials have different optical properties. The different materials allow light to propagate therethrough at different speeds. The different material properties are typically characterized by a difference in the index of refraction of the two materials. For example, passage of light through an interface between two such different materials, from the material permitting the slower propagation speed (higher index of refraction) to the material permitting the higher propagation speed (lower index of refraction) tends to bend the light away from an axis perpendicular to the interface surface. The theory of operation of the liquid crystal variable optic 10 is similar to that of the prior non-uniform substrate approach, except that instead of a large curved gap, the solution of FIGS. 1 and 2 utilizes a surface relief micro-structure diffuser with a large effective diffusion angle and can provide a large range in a beam shaping angle for the variable optic. Changing the voltage and thus the electric field applied to the liquid crystal material changes the crystal orientation and thus the refractive index the liquid crystal material. The focal length of the variable lens function of the optic changes as a function of the difference between the refractive indices of liquid crystal material and the surface relief micro-structure diffuser. The variable liquid crystal optic thereby provides a tunable diffuser capability, that is to say providing variable beam shaping over a range, e.g. as defined by the index of refraction of the surface relief micro-structure diffuser and the range of variable index of refraction of the liquid crystal material for any given crystal alignment responsive to the electric field produced by a currently applied voltage value.

Light refracts, changing wave shape and thus direction of some beams within the wave, as the light wave travels by an obstacle or through an aperture in its path. The light wave tends to wrap around edges of the obstacle or aperture effectively spreading the light of the wave. From the perspective of diffraction optics, the micro structure features of the diffuser are pseudorandom patterns which were carefully designed to generate uniform-diffused light.

Using the example of the optic structure of FIGS. 1 and 2, and expanding on the high level discussion of operation of the variable optic, the following provides a more detailed description of the material and optical characteristics and considerations useful in selecting particular material components for a variable liquid crystal optic. Different combinations of materials for the diffuser 15 and the liquid crystal material 23 produce different performance. Design of an optic suitable for a particular application involves appropriate selections of those materials.

As noted, although not perfect lenses, the convex micro-features 17 are similar to micro-lenses in an array or the like. The features 17 have curved shapes similar to lenses. In the aggregate, the convex micro-features 17 exhibit an average effective diffusion angle, which may correspond to an average radius of curvature. The average effective diffusion angle may approximately correspond to an average radius of curvature.

For each microlens like feature 17 of the optic 10, the net focal length is given by the equation:

$$f = \frac{R}{n_{SUB} - n_{eff}(V)} \quad (1)$$

where R is the local radius of curvature of diffuser film;
$n_{SUB}$ is the refractive index of the substrate of the diffuser film; and
$n_{eff}(V)$ is the effective refractive index of the liquid crystal material for an applied voltage V.

The material of the features of the surface relief micro-structure diffuser may be the same as or different from the material of the associated substrate. The publically available data for commercial diffuser films like the diffuser 15 of FIGS. 1 and 2 specifies the substrate material and index of refraction thereof. Hence, this discussion uses data for the index of refraction $n_{SUB}$ of the substrate 19 as the refractive index of the diffuser film 15, including as an approximation or the index of refraction of the micro-structure features 17. The table in FIG. 3 therefore lists the index of refraction of several such diffuser film substrates by way of example (as measured using light at 589 nm).

The R value of individual features is not readily available, and manufactures do not specify an average radius of curvature for the films currently being sold for light diffusion applications. Instead, the films are distinguished by different angles of diffusion. As a general matter, diffusers with larger angles of diffusion produce a larger beam shaping range in the variable optic 10 (approximating a larger average radius of lens-feature curvature). For example, the Luminit diffusers of both 20° and 40° have features of about the same width/pitch, i.e. 5-20 μm. The 40° diffuser features have deeper valleys between features. Shallow valleys of the 20° diffuser would correspond to shallow arc segments of larger circles, i.e. the effective radius of the circular feature curvature would be larger. However, with the deeper valleys, the height (not necessarily radius) of the features of the 40° diffuser would be greater.

The actual refraction of the optic in each of the various voltage states is a function of the relationship between indices of refraction of the two materials through which the light passes, in this case, the indices of the liquid crystal material 23 and the micro-structure features 17 of the film 15. The refractive index difference between the liquid crystal material and the features 17, as approximated by the index of substrate 19 of the film 15, is given by:

$$\Delta n_{DIF} = n_{SUB} - n_{eff}(V) \quad (2)$$

To provide a large range of focal lengths for performance of the variable optic 10, we will consider two particular values of the voltage V. One voltage value should provide substantial index matching so that the $\Delta n_{DIF}$ goes as near as feasible to 0. In that state, the index of refraction $n_{eff}(V)$ of the liquid crystal material 23 should be as close as possible to the index of refraction $n_{SUB}$ of the diffuser 15. In the other voltage state, under consideration at this point in the discussion, the difference $\Delta n_{DIF}$ would be as large as possible. In that other state, the index of refraction $n_{eff}(V)$ of the liquid crystal material 23 should be as different from the index of refraction $n_{SUB}$ of the diffuser 15 as possible. For a liquid crystal material 23 having the index of refraction one $n_{eff}(V_1)$ nearly equal to the index of refraction $n_{SUB}$ of the diffuser 15, the intended large value of $\Delta n_{DIF}$ means that the refractive index difference between the two states $n_{eff}(V_2)-n_{eff}(V_1)$ would also be as large as possible. In many operation examples, one of the voltage values $V_1$, $V_2$ would be 0 volts and the other one of the voltage values $V_1$, $V_2$ would have a maximum operating amplitude.

As shown in the table of FIG. 3, if the holographic diffuser film has a Polycarbonate (PC) substrate, the substrate typically has an index of refraction $n_{SUB}$ of 1.58. If the holographic diffuser film is Acrylic (e.g. PMMA), the substrate typically has an index of refraction $n_{SUB}$ of 1.49. If holographic diffuser film is Low-density polyethylene (LDPE or just PE), the substrate typically has an index of refraction $n_{SUB}$ of 1.51. For convenience, these values will be used for further discussion of performance if/when these example diffuser films are used as diffuser 15 together with several examples of readily available liquid crystal materials 23.

The examples utilize uniaxial nematic liquid crystal materials, which are commonly available. These types of liquid crystal materials are birefrengent. In two orthogonal axial directions, the liquid crystals exhibit a first index of refraction. In the third orthogonal axial direction, the liquid crystals exhibit a different second index of refraction. Orientations corresponding to either of the first or second axes, dominated by the first index of refraction, are referred to as the "ordinary" state. The index of refraction in this ordinary state is designated $n_o$. Orientation in a manner to receive light via the third axis and exhibit the other index of refraction is referred to as the "extraordinary" state. The index of refraction in this extraordinary state is designated $n_e$.

In one voltage state $V_1$ or $V_2$, the liquid crystals 29 are oriented to substantially all align in the "ordinary" state. In this state, the liquid crystal material will generally have an index of refraction corresponding to the "ordinary" state index, that is to say an index of $n_o$. The example of FIG. 2 assumes that the liquid crystal will align to be perpendicular to the substrate (parallel to the axis A-A) at high voltage in the ordinary state. However, LC's can be chosen to align parallel to the substrate depending on the materials used.

Nematic liquid crystal is a uniaxial birefringent material, and the extraordinary refractive index is along the long end of the liquid crystal, and ordinary refractive index is perpendicular to the long axis. At 0 volts, when there is no surface aligner on the substrate, the liquid crystals will orient randomly, and will be polarization independent, as shown in FIG. 1, and the refractive index will be equation (3) below. After a voltage is applied to the film, the liquid crystal director will try to orient towards the electrical field, and when the voltage is high enough, almost all of the liquid crystals will align in the ordinary state as shown in FIG. 2 except those close to the substrate.

In the example of FIGS. 1 and 2, without a surface aligner, there will be no voltage to generate an extraordinary state. As an alternative, with a surface aligner or elliptical diffuser, the liquid crystals would align in the extraordinary state at 0 volts.

Returning to the example, in the other one of the voltage states $V_1$ or $V_2$, the liquid crystals 29 are oriented randomly, that is to say in approximately 2:1 ratio of "ordinary" state and "extraordinary" state. In this state, the with two axial orientations providing the ordinary index of refraction $n_o$ and one axial orientation providing extraordinary state index of refraction $n_e$, the index of refraction of the material is an average value $n_{avg}$. Typically, the random state exhibiting the average index of refraction occurs when 0 volts is applied to the electrodes 13, 25 (V=V(0)); and the ordinary state is when the maximum magnitude of voltage V is applied to the electrodes 13, 25 (V=V(1)).

In one example of the optic 10, $\Delta n_{DIF}$ is high in one state (ordinary or average), and close to 0 in the other state (average or ordinary). This ca lead to reasonable, observable optical change as voltage is applied on the liquid crystals. Assuming no voltage and liquid crystals are randomly aligned in plane:

$$n_{eff}(0) = n_{avg} = \sqrt{(2n_o^2 + n_e^2)/3} \quad (3)$$

Rather than calculate a simple average, the formula (3) utilizes permittivity, which is related to the square of the index of refraction. For birefrengent liquid crystals, the permittivity varies relative to for different axes of the liquid crystals, as does the index of refraction. As outlined above, two axial directions of the liquid crystals exhibit the $n_o$ ordinary index of refraction, and one axial direction of the liquid crystals exhibit the $n_e$ extraordinary index of refraction. Hence, a coefficient 2 applies to the square of the $n_o$ ordinary index term, and a coefficient of 1 applies to the square of the $n_e$ extraordinary index term. The sum of the squares is divided by 3 to get an average permittivity, and the square root of the average permittivity gives an index of refraction average $n_{avg}$ for the liquid crystal material 23 based on the respective ordinary and extraordinary indexes of the particular liquid crystals 29.

The average in formula (3) gives a value for the index of refraction for the liquid crystal material 23 in the V(0) state, for comparative analysis vis-à-vis the index of refraction of the diffuser 15 at the interface of the diffuser with the liquid crystal material 23 (for which we are using the index $n_{SUB}$ for different examples of the film type implementations of the diffuser). For discussion purposes, this state corresponds to crystals aligned "parallel" to substrate (see FIG. 1).

Then, assuming high voltage is applied, the liquid crystals are aligned in the ordinary state (which discussion and illustration purpose corresponds to a state "perpendicular" to the substrate as in FIG. 2). The high voltage index of refraction is then:

$$n_{eff}(V) = n_o \quad (4)$$

Hence, for the V(0) average orientation state, the difference in indexes of refraction between the diffuser 15 and the liquid crystal material 23 is the difference between $n_{SUB}$ and $n_{avg}$, which may be:

$$\Delta n_{DIF}(0) = n_{SUB} - \sqrt{(2n_o^2 + n_e^2)/3} \quad (5)$$

For example, this difference should be high to create a lens in 0 voltage state.

Then, for the V(0) average orientation state, the difference in indexes of refraction between the diffuser 15 and the liquid crystal material 23:

$$\Delta n_{DIF}(V) = n_{SUB} - n_o \quad (6)$$

should be low to create the clear state when high voltage is applied.

The above two liquid crystal states can be reversed depending on the materials, for example, to produce the clear state for 0 voltage and a lens for the high voltage state. Basically the substrate would be substantially index matched to the liquid crystals in one state, and there would be an index or refraction difference in the other state, for optical control of focal length in a range between the two states. Use of a high birefringence liquid crystal material should allow for large change in $\Delta n_{DIF}$.

For a variable optic with a surface relief micro-structure diffuser, the difference between the values for $\Delta n_{DIF}(0)$ for the average state as in formula (5) and $\Delta n_{DIFF}(V)$ for the ordinary state as in formula (6) may be as large as possible for otherwise suitable materials that may be chosen for the diffuser 15 and the liquid crystal material 23. A larger difference between these two $\Delta n_{DIF}$ values would correspond to a larger range of focal lengths for the controllable optic. Implementation of optics with larger ranges may also involve choosing a surface relief micro-structure diffuser having a large angle of diffusion.

From the aspect of diffraction optics, the output light intensity distribution of the normal incident light after the diffraction patterns could be described by the following equation:

$$n_t \sin\theta_d = n_i \sin\theta_i - m\frac{\lambda}{\Lambda} \tag{7}$$

where $n_t$ is the refractive index of the microstructure of diffuser;

$n_i$ is the refractive index of material covered the diffuser microstructures, for a diffuser without liquid crystal material, it is air, and for a diffuser with liquid crystal material, it is the refractive index of liquid crystal material;

$\theta_d$ is the diffracted angle of the light; $\theta_i$ is the incident light angle;

m is a integer representing the propagation mode light, and $\Lambda$ is the period of the diffraction grating.

As can be seen from the equation (7), the diffracted light distribution is dependent on the refractive index of the incident light, which in the examples, is the effective index of the liquid crystal material. By changing the refractive index of the liquid crystal material through applied voltage, the light distribution can be controlled. So, from either the geometric optics perspective or from the diffraction optics perspective, it is the controllable refractive index of the liquid crystal that contributes to the control of beam distribution.

FIG. 4 is a table of data for five readily available liquid crystal materials for which relevant data has been published, for use as non-limiting examples. For each of the examples, the table lists the ordinary index of refraction $n_o$, the extraordinary index of refraction $n_e$, the $\Delta n$ or birefringence expressed by the difference between the $n_o$ and $n_e$ values, as well as the average index of refraction calculated by formula (3) above.

The table in FIG. 4 also includes two columns for each of the diffuser materials listed in the table of FIG. 3. One such column for each diffuser material lists the difference between the index of refraction $n_{SUB}$ for the particular diffuser material and the ordinary index of refraction $n_o$ for each of the five liquid crystal materials in the ordinary state. The other column for each material lists the difference between the index of refraction $n_{SUB}$ for the particular diffuser material and the index of refraction $n_e$ for each of the five liquid crystal materials in the extraordinary state. Several of the examples show that one state of the example liquid crystal material provides a substantial index of refraction match and that the other state of the example liquid crystal material provides a substantial difference from the index of refraction of the particular diffuser example material.

A wide variety of liquid crystal materials are known and available from one or more vendors. Also, a liquid crystal vendor often can readily adjust manufacturing process steps to produce a variant liquid crystal material to match properties of the material to specifications for a particular application. Hence, the non-limiting examples of FIGS. 3 and 4 are shown and discussed here to demonstrate feasibility of constructing and operating a variable liquid crystal optic 10 in the manner discussed here relative to FIGS. 1 and 2. Other suitable liquid crystal materials are available or may be readily developed to the specification for a particular variable optic design application.

FIG. 5 illustrates an alternate example 50 of a variable liquid crystal optic, using two surface relief micro-structure diffusers. Similar to the example of FIGS. 1 and 2, the variable liquid crystal optic 50 includes a diffuser 15 in the form of a micro-structure film, where the film includes convex micro-features 17 formed on a substrate 19 of the diffuser 15. The variable liquid crystal optic 50 also includes a transparent electrode 25 associated with the surface relief micro-structure diffuser 15. Although other placements/configurations of the second transparent electrode may be used, in this example, the transparent electrode 25 is formed on surfaces of micro-structure features 17 of the film type diffuser 15 facing the gap 21. The liquid crystals 29 of the material 23 are similar to those in the example of FIG. 1.

In the example, the variable liquid crystal optic 50 includes an additional surface relief micro-structure diffuser and associated transparent electrode. Although other types of diffusers may be used, this example uses another diffuser 51, like diffuser film 15 in the example of FIGS. 1 and 2. The surface relief micro-structure diffuser 51 includes convex micro-features 57 formed on a substrate 59 of the diffuser 51. The variable liquid crystal optic 50 also includes a transparent electrode 55 associated with the surface relief micro-structure diffuser 51. Although other placements/configurations of the second transparent electrode may be used, in this example, the transparent electrode 52 is formed on surfaces of micro-structure features 57 of the film type diffuser 55 facing the gap. Although of the same general type in this example, the two diffusers 15, 51 may be different film type products from the same or different manufacturers, e.g. two diffuser films formed of different ones of the available materials (see sample listing in FIG. 3), two diffuser films having different feature widths, two diffuser films having different depths of the valleys between features, one diffuser film having more elongated features than the other, etc. The transparent electrode 55 may be formed of any of the materials discussed above relative to the electrode 25; although in any particular design for the optic 50, the two electrodes may be formed of different transparent conductor materials.

Operation of the optic 50, however, is fairly similar to that of the optic 10 in the earlier example. The transparent electrodes 25 and 55 are configured to generate an electric field in the liquid crystal material 23 in the non-uniform gap, in response to a control voltage V applied across the first and second transparent electrodes, for example, by a suitable driver circuit 27. The field sets orientation of uniaxial nematic liquid crystals 29 in the material 23 and thus the index of refraction of the uniaxial nematic liquid crystal material 23 filling the non-uniform gap. This index of refraction setting in turn sets a focal length of the variable light shaping optic 10, in essentially the manner described above relative to FIGS. 1 to 4.

Figure 6:
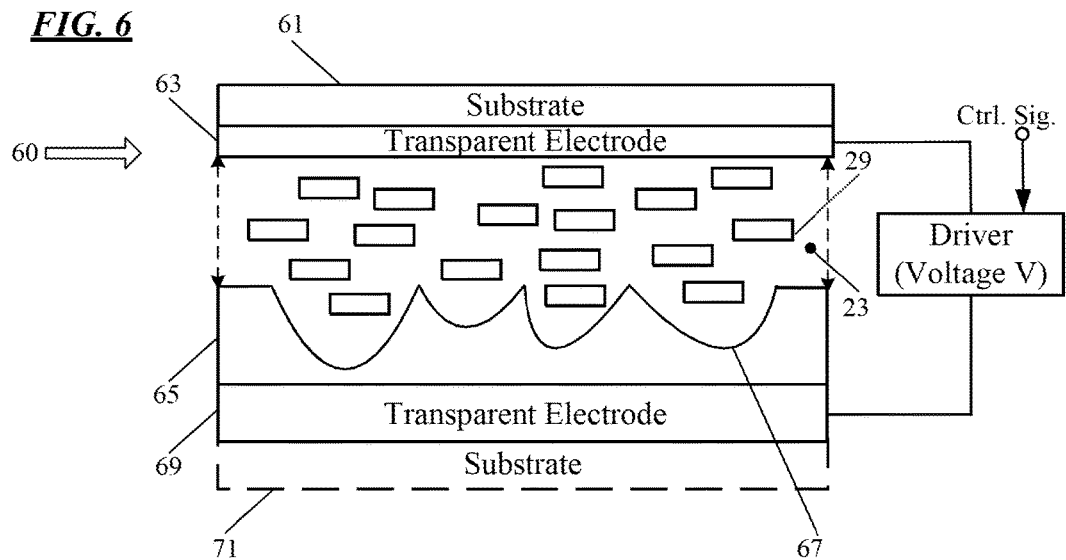
FIG. 6 is a cross-sectional view of a simplified stack for another example of a variable liquid crystal optic, using a different type of surface relief micro-structure diffuser.

FIG. 6 illustrates another alternate example 60 of a variable liquid crystal optic, using a surface relief microstructure diffuser, in this case having concave micro-structure features. The example optic 60 includes a transparent substrate 61 and a transparent electrode 63 formed on the transparent substrate 61. The substrate 61 and electrode 63 have shapes and may be formed of materials as discussed above relative to transparent substrate 11 and transparent electrode 13. Although not shown, an additional surface relief micro-structure diffuser (with convex or concave micro features) may be provided in association with the transparent electrode 63.

In this example, the variable liquid crystal optic 60 includes a surface relief micro-structure diffuser 65. This diffuser is formed of a suitable material so as to have the micro-structure features 67 formed in a concave fashion extending from a surface of the diffuser 65 at the gap inward and away from the gap. The size and shape of the features 67 may be similar to the size and shape of features on the film examples discussed earlier.

The variable liquid crystal optic 60 also includes a transparent electrode 69 associated with the diffuser 65. The material of the electrode 69 may be similar to the materials used for the various transparent electrodes discussed above. In the optics discussed herein, the electrode associated with any of the diffusers may be formed on the diffuser features (see FIGS. 1, 2 and 5) or at other locations. Hence, in the optic 60, the electrode 69 may be formed on the gap facing surfaces of the features 67, that is to say on surfaces inside the concave features 67. To illustrate the point about other possible locations of the electrode associated with a diffuser, however, the example optic 60 has the electrode 69 associated with a surface of the diffuser 65 opposite the gap. If the material of the diffuser 65 is sufficiently rigid and strong, the transparent electrode 69 may be coated or otherwise formed on the surface of the diffuser 65 opposite the gap.

As an option or alternative (shown in dotted lines), the variable liquid crystal optic 60 may include an additional transparent substrate 71 of glass or the like similar to substrates 19 and 61. In this alternative example, the transparent electrode 69 may be formed on the substrate 71 and the diffuser 65 formed on or joined to the transparent electrode 69.

Operation of the optic 60, however, is fairly similar to that of the optics 10, 50 in the earlier examples. The transparent electrodes 63 and 69 are configured to generate an electric field in the liquid crystal material 23 in the non-uniform gap, in response to a control voltage V applied across the first and second transparent electrodes, for example, by a suitable driver circuit 27. The field sets orientation of uniaxial nematic liquid crystals 29 in the material 23 and thus the index of refraction of the uniaxial nematic liquid crystal material 23 filling the non-uniform gap. This index of refraction setting in turn sets a focal length of the variable light shaping optic 60, in essentially the manner described above relative to FIGS. 1 to 4.

Figure 7:
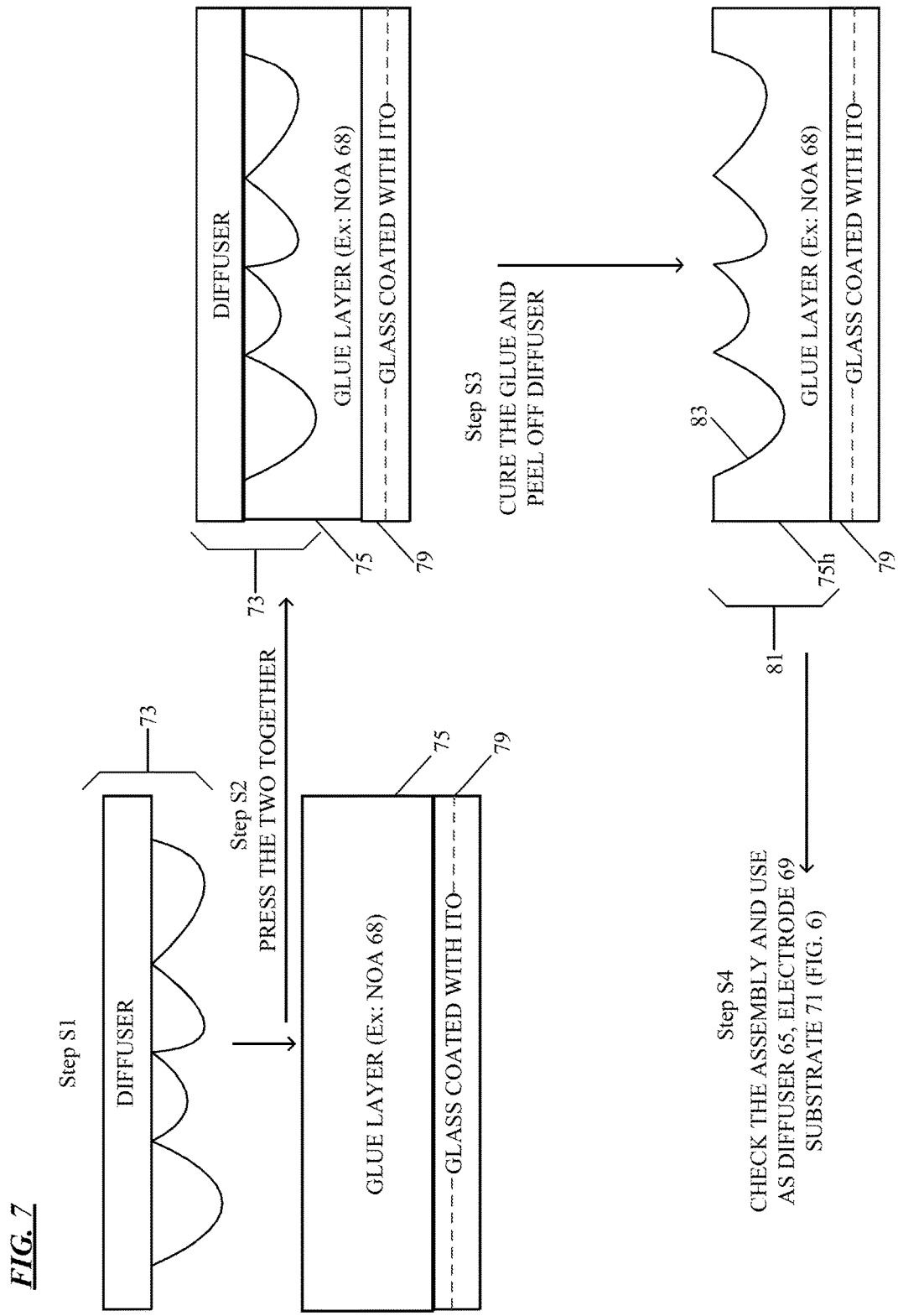
FIG. 7 illustrates steps of a simple technique for forming the surface relief micro-structure diffuser used in the variable optic of FIG. 6.

FIG. 7 shows steps of an example of a simple technique for forming a surface relief micro-structure diffuser having concave micro-structure features, like the diffuser 65, along with a substrate and an electrode associated with the diffuser. In general, the method utilizes a surface relief micro-structure diffuser 73, similar to the film 15 of FIGS. 1, 2 and 5, as a pattern to mold concave features into a material that is initially pliable but may be hardened into the desired diffuser shape.

The example process, utilizes an electrode formed on a transparent substrate. In the drawing, these elements are shown together at 79 where the substrate is glass and the electrode is ITO. Step S1 involves forming a pliable layer 75 on the combined glass substrate and ITO electrode 79. Although other transparent pliable materials may be used, the example utilizes Norland Optical Adhesive 68 ("NOA68"), which is available from Norland Products, Inc. It may be more effective for the ITO electrode to be adjacent the pliable layer 75 (and thus closer to the liquid material 23 as in FIG. 6), but it may also be sufficient for arrangement the elements with the substrate between the ITO electrode and the pliable layer 75.

At step S1, the material 75 is still in a pliable state. Step S2 involves pressing the surface relief micro-structure diffuser 73 together with elements 75, 79, so that the convex micro features of the diffuser 73 form concave indentations in the pliable layer 75, as shown to the right of the arrow for S2 in the drawing. Step S3 entails curing the pliable layer 75, in the example, the glue. When the layer has hardened (into 75*h* illustrated below the arrow of S3), the diffuser 73 is peeled off.

After the diffuser is peeled off, the hardened layer 75*h* forms a surface relief micro-structure diffuser 81 having concave micro features 83. The features 83 of the diffuser 81 are essentially indentations in the layer 75*h* mirroring the convex micro features of the surface relief micro-structure diffuser 73.

Step S4 involves checking the assembly completed in the previous step; and then, the diffuser 81 and the glass and ITO element 79 can be used as diffuser 65, electrode 69 substrate 71 of optic 60 in FIG. 6.

Examples of variable light shaping optics using liquid crystals, like those shown in FIGS. 1, 2, 5 and 6, may be used in a variety of applications. Example applications include lighting applications, where such an optic controllably processes light from a an artificial light source as well as light responsive signal generation applications (e.g. sensing, optical power generation, etc.) where such an optic controllably processes incoming light for output to a detector or the photovoltaic device. Sensing applications may include imaging type applications, for machine visions or the like, particularly where resolution may be low (note that the features of the surface relief micro-structure diffusers are not perfect lenses, and imaging through such diffusers may be of low quality).

Light output from the luminaire or other lighting device with a variable light shaping optics using liquid crystals may carry information, such as a code (e.g. to identify the luminaire or its location) or downstream transmission of communication signaling and/or user data. The light based data transmission may involve modulation or otherwise adjusting parameters (e.g. intensity, color characteristic, or beam shape) of the illumination light output from the device.

The examples of variable light shaping optics using liquid crystals, of FIGS. 1, 2, 5 and 6, are readily scalable. Such an optic may have lateral dimensions appropriate for a camera lens or a flash lens/diffuser. Such an optic, however, may have lateral dimensions appropriate for use of the optic with a large area light source, such as across the output surface area of a panel type luminaire. Performance of the variable liquid crystal optic is similar regardless of differences of scale in the lateral dimensions. For example, the voltage values to operate small and large scale optics would be essentially the same for a given optic stack configuration. The larger scale implementation, however, would require more current to drive the wider variable optic.

The examples show a stack for a single variable liquid crystal type light shaping optic, e.g. for use as a variable beam shaping diffuser in applications as outlined above. To increase the angular beam shaping range, a number of such optics may be stacked together, back to back (in some cases, with one substrate serving as a substrate of two adjacent optic stacks).

The discussion so far has concentrated on examples of the structure and operation of variable light shaping optics using liquid crystals in which the optics are transmissive. Light is received in one direction at an input surface, controllably processed within the optic, and emitted via an output surface generally opposite the input surface. The variable optic principles discussed herein may also apply to reflective optics. In that regard, it may be helpful to consider a couple of reflective examples.

Figure 8:
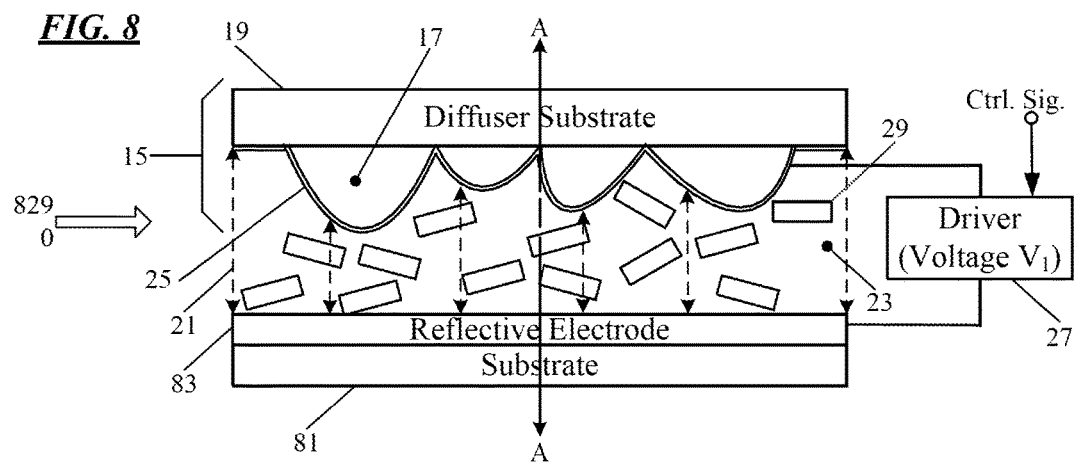
FIG. 8 is a cross-sectional view of a simplified stack for another example of a variable liquid crystal optic, in which one of the electrodes is reflective.

FIG. 8 is a cross-sectional view of a simplified stack for another example of a variable liquid crystal optic, in which one of the electrodes is reflective. This example is generally similar in structure to the example of FIGS. 1 and 2; and the similar components are indicated by the same reference numerals as used in FIGS. 1 and 2. The example optic 80 of FIG. 8 includes a transparent substrate 81, which need not be transparent. The optic 80 also includes a first electrode 83 formed on the substrate 81. The electrode 83, however, is reflective. Such an electrode, for example, may be formed by deposition of a reflective metal deposited on the appropriate surface of the substrate 81.

Light enters the reflective variable optic 80 through the diffuser 15 and passes through the micro-features 17, the electrode 25 and the liquid crystal material 23. The light reflects off of the reflective electrode 83. The reflected light passes back through the liquid crystal material 23, the electrode 25 and the micro-features 17. The processed reflected light emerges from the optic, in this example, from the surface of the diffuser substrate 19. Light is refracted at the interface between the micro-features 17 and the liquid crystal material 23 (for convenience, assumed the effect of thin electrode 25 is deminimis). This refraction occurs in both directions, both as the light enters the optic 80 and after reflection of the light by the electrode 83. In both directions, the degree of diffraction is controlled by the control of the state of the liquid crystals 29, based on voltage V applied by the driver 27, essentially as described above relative to FIGS. 1 and 2.

Figure 9:
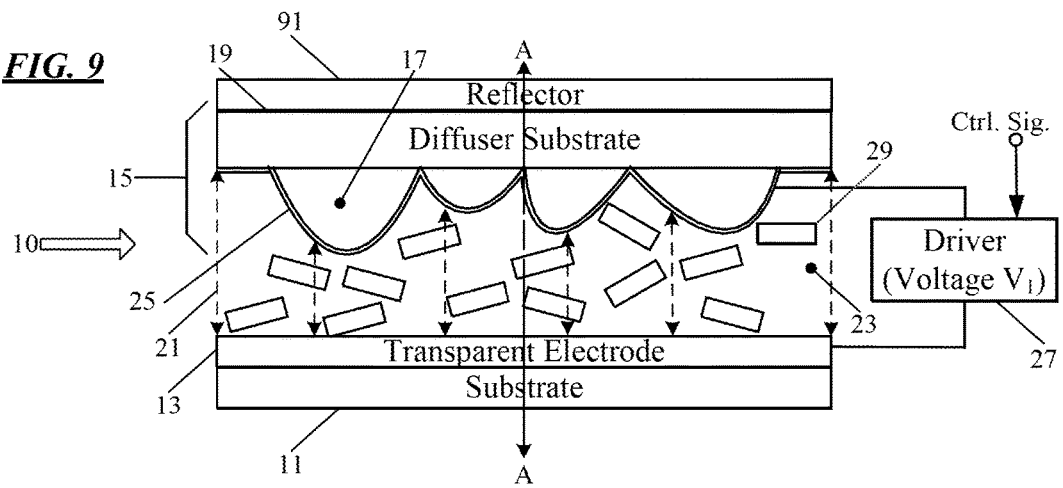
FIG. 9 is a cross-sectional view of a simplified stack for another example of a variable liquid crystal optic, including a reflector associated with the surface relief micro-structure diffuser.

FIG. 9 is a cross-sectional view of a simplified stack for yet another example of a variable liquid crystal optic, including a reflector associated with the surface relief microstructure diffuser. This example is generally similar in structure to the example of FIGS. 1 and 2; and the similar components are indicated by the same reference numerals as used in FIGS. 1 and 2. The example optic 90 includes a reflector 91, formed of a reflective metal or other suitable metal deposited on the surface of the diffuser substrate 19 opposite the micro-features 17. The reflector 91 is not used as an electrode in this example and therefore need not be conductive.

Light enters the reflective variable optic 90 through the substrate 11 and passes through the electrode 13, the liquid crystal material 23, the electrode 25, the micro-features 17 and the diffuser substrate 19. Instead of emerging from the optic at that point, the light is reflected by the reflector 91. The reflected light passes back through the substrate 19, the micro-features 17, the electrode 25, the liquid crystal material 23, and the electrode 13 and emerges from the optic 90 via the substrate 11. Light is refracted at the interface between the micro-features 17 and the liquid crystal material 23 (for convenience, assumed the effect of thin electrode 25 is deminimis). This refraction occurs in both directions, both as the light enters the optic 90 and after reflection by the reflector 91. In both directions, the degree of diffraction is controlled by the control of the state of the liquid crystals 29, based on voltage V applied by the driver 27, as described above relative to FIGS. 1 and 2.

The discussion so far has concentrated on examples of the structure and operation of variable light shaping optics using liquid crystals and provided some high-level discussions of just a few possible applications of such optics. It may be helpful to consider an example of a system incorporating such a light shaping optic.

Figure 10:
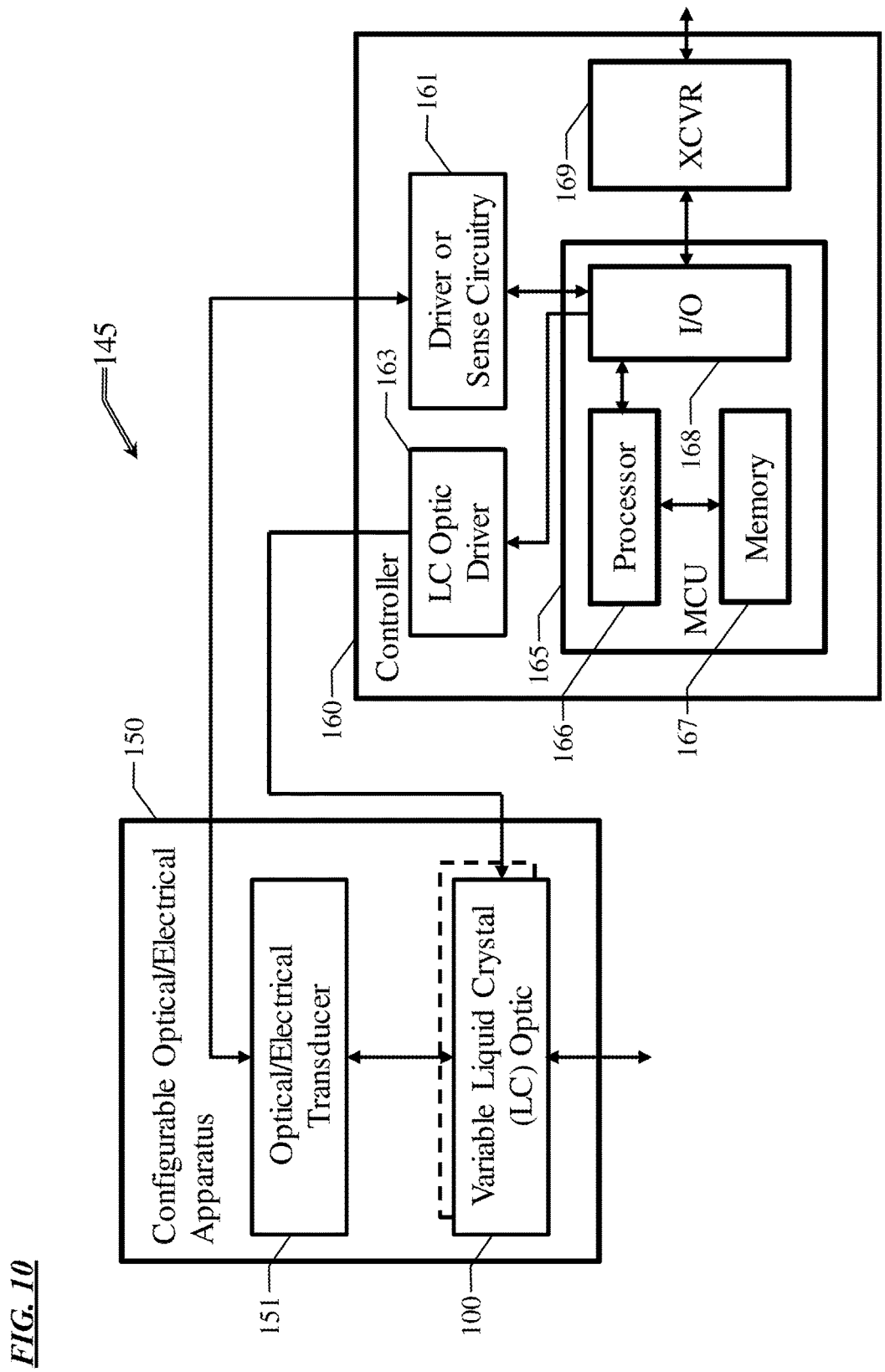
FIG. 10 is a simplified functional block diagram of a system combining a variable liquid crystal optic with an optical/electrical transducer and associated circuitry.

FIG. 10 is a simplified functional block diagram of a system 145, which includes a configurable optical/electrical apparatus 150 and a controller 160. The configurable optical/electrical apparatus 150 combines a variable light shaping optic 100 using liquid crystals with an optical/electrical transducer 151. The variable liquid crystal (LC) optic 100 may be similar to any one of the earlier example optics. Although associated circuitry may be provided in the apparatus 150, the example shows circuitry in the controller 160, which may be somewhat separate from or even remote from the configurable optical/electrical apparatus 150.

An optical/electrical transducer 151 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 151 include various conventional lamps, such as incandescent, fluorescent or halide lamps; one or more light emitting diodes (LEDs) of various types, such as traditional LEDs, planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Any of these types of LEDs may (or may not) be packaged with or coupled to photo-luminescent materials, such as phosphors, to effectively shift wavelength(s) of some of the light produced by the actual LED chips. Of course, these light generation technologies are given by way of non-limiting examples, and other suitable light generation technologies may be used to implement the transducer 151.

When optical transducer 151 is a light source, the light source may use a single emitter to generate light or may combine light from some number of emitters that generate the light. A lamp or 'light bulb' is an example of a single source. A LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 151 may or may not be pixelated for control purposes. The variable liquid crystal optic 100 is controlled to selectively optically change or spatially (optically) modulate the shape of the light distribution output from the transducer and thus from the apparatus 150.

In another example, optical transducer 151 is an optical-to-electrical converter, that is to say, a light sensor or detector or a photovoltaic device. The overall apparatus 150 in such a case may be configured as a light responsive sensor, an imager, a light responsive power source, or the like. The light detector may be an array of light detectors, a photo-detector such as a photodiode, or a photovoltaic device, depending on the desired function of optical/electrical apparatus 150. Other suitable light detectors for use as optical/electrical transducer 151 include charge-coupled device (CCD) arrays, complementary metal-oxide-semiconductor (CMOS) arrays, photomultipliers, image intensifiers, phototransistors, photo resistors, thermal imagers, and micro-electromechanical system (MEMS) imagers. Nonetheless, virtually any detector of light may be used as the transducer 151 in an optical-to-electrical arrangement of apparatus 160. Suitable light detectors will be known to one of ordinary skill in the art from the description herein. The variable liquid crystal optic 100 is controlled to selectively optically change or spatially (optically) modulate the field of view of light coming into the apparatus 150 for delivery to transducer 151. The variable liquid crystal optic 100 therefore supports controlled beam shaping, with respect to light from a field of intended view for the particular optical-to-electrical application of the apparatus 150.

While light source examples and light detector examples are described separately, it will be understood that both types of optical/electrical transducers 151 may be present in a single optical apparatus 150 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern or field of view.

In an overall apparatus 150, with an optical/electrical transducer 151, the variable liquid crystal optic 100 optionally may have a lens on one side or the other side or have lenses on both sides, of the variable liquid crystal optic 100, along the axis of the optical path through the optic 100 and to or from the transducer 151. Such a lens may help to extend the range of beam shaping angles of an apparatus 150 that incorporates a particular design or stack structure for the variable liquid crystal optic 100. As an alternative to using a lens, another approach to extend beam shaping range involves stacking two or more variable liquid crystal optics back to back (in some cases, with one substrate serving as a substrate of two adjacent optic stacks). FIG. 10 therefore shows an additional/optional variable liquid crystal optic (in dotted line form) associated with the optic 100. Each such variable liquid crystal optic in a stack could be individually controlled by a voltage applied from a different control channel of the driver 163 (or from a separate additional LC optic driver). The stacked optics may have similar structures or somewhat different structures (e.g. different diffusers and/or different liquid crystal materials).

Although not shown, additional optical processing elements may be provided in the apparatus 150. In a luminaire for general illumination or in another type of light emission device (e.g. a flash), for example, an emitter type transducer 151 may be coupled to the variable liquid crystal optic 100 via a collimating optic, such as a total internal reflection (TIR) lens.

A transducer 151, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 151, the controller 160 includes corresponding driver or sense circuitry 161. The type of circuitry 161 would depend on the type of transducer 151.

The controller 160 includes a liquid crystal (LC) optic driver 163 to selectively provide signals to the electrodes to control the state of the variable liquid crystal optic 100 (and any other such optics if included). The driver 163, for example, may be circuitry constructed/configured to apply direct current (DC) voltages or alternating current (AC) voltages or AC with a DC offset to the electrodes of each liquid crystal optic in the apparatus 150. A variable liquid crystal optic 100, for example, may be driven with an AC squarewave, however, direct current (DC) and other waveforms can be used. The amplitudes can be as high as 200V, and as low as 10V. The voltage amplitudes used are primarily dependent on the fabrication of the liquid crystal variable light shaping optic 100. In regards to the states when the amplitude is high, versus low, this is dependent on desired ordinary operating condition (alignment state) and which liquid crystals are chosen. In our case, we assume that the liquid crystals are aligned parallel to the axis A-A as in FIG. 2 (perpendicular to the substrate(s)) at high voltage $V_2$, and randomly oriented as in FIG. 1 at low voltage $V_1$.

The controller 160 also includes a processor, one or more digital storage media, data and programming in the storage and appropriate input/output circuitry. Although other processor based architectures may be used (e.g. architectures built around one or more microprocessors), the example of controller 160 utilizes a Micro-Control Unit (MCU) 165, which implements the control logic for the controller 160 and thus of the system 145. For example, the MCU 165 implements the logic for control of operations of the associated optical/electrical apparatus 150. Although shown as controlling only one such apparatus 150, the MCU and controller may control a number of such apparatuses 150.

The MCU 165 may be a microchip device that incorporates a processor 166 serving as the programmable central processing unit (CPU) of the MCU 165 as well as one or more memories, represented by memory 167 in the drawing. The memory 167 is accessible to the processor 166, and the memory or memories 167 store executable programming for the CPU formed by processor 166 as well as data for processing by or resulting from processing of the processor 166. The MCU 165 may be thought of as a small computer or computer like device formed on a single chip. Such devices are often used as the configurable control elements embedded in special purpose devices rather than in a computer or other general purpose device. A variety of available MCU chips, for example, may be used as the MCU 165 in the controller 160 of system 145.

The MCU 165 in this example also includes various input and output (I/O) interfaces, shown collectively by way of example as interface 168 in FIG. 10. The I/O interfaces 168, for example, support a control output to the LC optic driver 163 as well as a control output and/or input to the driver or sense control circuitry 161 (for the optical/electrical transducer 151). The I/O interfaces 168 also support input/output communications with one or more electronic devices, which may be connected to or incorporated in the system 145 (e.g. to provide a user interface not shown) or which may be remote.

In the illustrated example, the controller 160 also includes a communication transceiver (XCVR) 169 coupled to the processor 166 (and possibly to the memory 167) via an I/O interface 168 of the MCU 165. Although shown separately, the transceiver 169 may be implemented in circuity on the same chip as the elements of the MCU 165. Although the drawing shows only one transceiver 169, controller 160 may include any number of transceivers, for example, to support additional communication protocols and/or provide communication over different communication media or channels.

The transceiver 169 supports communication with other control or processing equipment, for example, with a remote user interface device and/or with a host computer of a building control and automation system (BCAS) or the like. The transceiver 169 may also support system communication with a variety of other equipment of other parties having access to the system 145 in an overall/networked system encompassing a number of similar systems 145, e.g. for access to each system 145 by equipment of a manufacturer for maintenance or access to an on-line server for downloading of programming instructions or configuration data for setting aspects of sensing or lighting operation of the associated optical/electrical apparatus(s) 150. The circuitry of the transceiver 169 may support such communication(s) over any available medium, such as wire(s), cable, optical fiber, free-space optical link or radio frequency (RF) link.

The example in FIG. 10 utilizes a MCU 165, which incorporates, for example, the processor and a memory. As noted, the controller 160 may use a microprocessor instead of the MCU. A microprocessor based approach typically includes external memory or other data storage device(s) as well as a variety of other system components coupled for local data communication (e.g. via a bus) with the microprocessor. A microprocessor base configuration for the controller 160 may be similar to that of any of a variety of types of types of other smart electronic devices, such as an architecture for a personal computer or an architecture for a mobile terminal device. The MCU and microprocessor-based approaches are given only by way of non-limiting examples.

As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The applicable processor executes programming or instructions to configure the system 145 to perform various operations. For example, such operations may include various general operations (e.g., a clock function, recording and logging operational status and/or failure information) as well as various system-specific operations (e.g. controlling beam shaping of input or output light, operation of the transducer(s) and the like) of an optical/electrical apparatus 150 incorporating one or more of the variable liquid crystal optics and associated transducer(s). Although a processor may be configured by use of hardwired logic, typical processors in lighting devices or in light responsive devices are general processing circuits configured by execution of programming, e.g. instructions and any associated setting data from the memories shown or from other included storage media and/or received from remote storage media.

As outlined above, a class of applications of the variable liquid crystal optic 100 with suitable light source type transducers provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Another class of applications for the variable liquid crystal optic relate to sensing applications. A sensing application typically combines a detector type transducer with one or more variable liquid crystal optics. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other system level applications of the variable liquid crystal optic also are within the scope of the disclosure above.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A variable light shaping optic, comprising:
   a first transparent substrate having an input surface to receive incoming light input from a light source;
   a first transparent electrode on the first transparent substrate;
   a second transparent substrate having an output surface to emit illumination light output;
   a first surface relief micro-structure diffuser located on the first transparent substrate and including first micro-structure features having pseudorandom patterns and curved lens-like surfaces facing a non-uniform gap;
   a second surface relief micro-structure diffuser located at a distance from the first transparent substrate to form a non-uniform gap and including second micro-structure features having pseudorandom patterns and extending toward the first transparent substrate, each of the second micro-structure features having a width between 5-20 micrometers (µm) and including a curved lens-like surface facing the non-uniform gap;
   a uniaxial nematic liquid crystal material filling the non-uniform gap, wherein the incoming light input first passes through the first transparent substrate, then passes through the uniaxial liquid crystal material, and then passes through the second surface relief micro-structure diffuser as the illumination light output; and
   a second transparent electrode associated with the second surface relief micro-structure diffuser,
   wherein:
      the first and second transparent electrodes are configured to generate an electric field in the uniaxial nematic liquid crystal material in response to a control voltage applied across the first and second transparent electrodes, to set orientation of uniaxial nematic liquid crystals in the uniaxial nematic liquid crystal material and thus an index of refraction of the uniaxial nematic liquid crystal material filling the non-uniform gap, to set a focal length of the variable light shaping optic,
      the first transparent electrode has curved lens-like surfaces facing the non-uniform gap and is formed directly on the curved lens-like surfaces of the first micro-structure features,
      the second transparent electrode has curved lens-like surfaces facing the non-uniform gap and is formed directly on the lens-like surfaces of the second micro-structure features, and
      the non-uniform gap is directly defined by the curved lens-like surfaces of the first and second transparent electrodes, respectively.

2. The variable light shaping optic of claim 1, wherein: the second surface relief micro-structure diffuser is a film on the second transparent substrate and comprises convex micro-structure features with valleys between; and each of the convex micro-structure features is curved outward from the second transparent substrate toward the non-uniform gap.

3. The variable light shaping optic of claim 1, wherein the second surface relief micro-structure diffuser is located between the second transparent electrode and the second transparent substrate.

4. A controllable optical apparatus comprising the variable light shaping optic of claim 1 and a driver circuit connected to the first and second transparent electrodes, the driver circuit being controllable to provide different values of the control voltage.

5. The controllable optical apparatus of claim 4, wherein:
   a first value of the control voltage orients the uniaxial nematic liquid crystals in the uniaxial nematic liquid crystal material so that the uniaxial nematic liquid crystal material exhibits a first index of refraction at least substantially similar to a third index of refraction of the second surface relief micro-structure diffuser, and
   a second value of the control voltage orients the uniaxial nematic liquid crystals in the uniaxial nematic liquid crystal material so that the uniaxial nematic liquid crystal material exhibits a second index of refraction at least substantially different from the third index of refraction of the second surface relief micro-structure diffuser.

6. An apparatus comprising the variable light shaping optic of claim 1 and an optical/electrical transducer optically coupled to send or receive light through the variable light shaping optic.

7. A system comprising the apparatus of claim 6, further comprising a processor coupled to control the variable light shaping optic and the optical/electrical transducer.

* * * * *